United States Patent
Lee et al.

(10) Patent No.: US 12,038,324 B2
(45) Date of Patent: Jul. 16, 2024

(54) SINGLE PHOTON DETECTOR, AND OPERATION METHOD

(71) Applicant: KT CORPORATION, Gyeonggi-do (KR)

(72) Inventors: Min Soo Lee, Gyeonggi-do (KR); Jeonghwan Shin, Gyeonggi-do (KR); Kyung-Woon Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 18/031,985

(22) PCT Filed: Oct. 8, 2021

(86) PCT No.: PCT/KR2021/013926
§ 371 (c)(1),
(2) Date: Apr. 14, 2023

(87) PCT Pub. No.: WO2022/080783
PCT Pub. Date: Apr. 21, 2022

(65) Prior Publication Data
US 2023/0384154 A1    Nov. 30, 2023

(30) Foreign Application Priority Data
Oct. 14, 2020   (KR) .................. 10-2020-0132506

(51) Int. Cl.
*G01J 1/44* (2006.01)
*H04B 10/70* (2013.01)

(52) U.S. Cl.
CPC ........... *G01J 1/44* (2013.01); *G01J 2001/442* (2013.01); *H04B 10/70* (2013.01)

(58) Field of Classification Search
CPC .................. G01J 1/44; G01J 2001/442; G01J 2001/4466; H04B 10/70
See application file for complete search history.

(56) References Cited

U.S. PATENT DOCUMENTS 7,705,284 B2 *   4/2010   Inoue .................... H01L 31/107
                                                                  398/189
2006/0219871 A1   10/2006   Takahashi et al.
(Continued)

FOREIGN PATENT DOCUMENTS

| JP | 2006-284202 A | 10/2006 |
| JP | 2011-508869 A | 3/2011 |

(Continued)

OTHER PUBLICATIONS

Japan Patent Office, Office Action of corresponding JP Patent Application No. 2023-523181, Apr. 9, 2024.

*Primary Examiner* — Kevin K Pyo
(74) *Attorney, Agent, or Firm* — IP Legal Services, LLC

(57) ABSTRACT

Provided are a single photon detector and an operation method thereof. The single photon detector may include a gate signal generator for generating a gate signal having a first pulse width ($\Delta P$) with respect to a first time point ($t_1$); and a first photon detector for detecting the single photon while operating in a Geiger mode by receiving the gate signal, and outputs a photon detection signal at a second time point ($t_2$), wherein the first photon detector outputs the photon detection signal at the second time point ($t_2$) spaced apart at a predetermine time interval ($\Delta T$) from the first time point ($t_1$).

7 Claims, 6 Drawing Sheets

(56) References Cited

U.S. PATENT DOCUMENTS

| | | |
|---|---|---|
| 2010/0034390 A1 | 2/2010 | Yamamoto et al. |
| 2010/0111305 A1 | 5/2010 | Yuan et al. |
| 2010/0294919 A1 | 11/2010 | Kardynal et al. |
| 2012/0085891 A1 | 4/2012 | Cho et al. |
| 2012/0168612 A1 | 7/2012 | Kardynal et al. |
| 2012/0230702 A1 | 9/2012 | Yuan et al. |
| 2014/0119537 A1 | 5/2014 | Legre et al. |
| 2015/0034808 A1 | 2/2015 | Yuan et al. |
| 2016/0328211 A1 | 11/2016 | Nordholt et al. |
| 2017/0230174 A1 | 8/2017 | Choi |
| 2018/0152294 A1 | 5/2018 | Legre et al. |
| 2018/0239592 A1 | 8/2018 | Nordholt et al. |
| 2020/0044836 A1 | 2/2020 | Kim et al. |
| 2020/0195428 A1 | 6/2020 | Rhee et al. |
| 2020/0233645 A1 | 7/2020 | Nordholt et al. |
| 2021/0050461 A1 | 2/2021 | Park et al. |

FOREIGN PATENT DOCUMENTS

| | | |
|---|---|---|
| JP | 4759697 B2 | 8/2011 |
| JP | 2012-084877 A | 4/2012 |
| JP | 2013-539327 A | 10/2013 |
| JP | 2020-509716 A | 3/2020 |
| KR | 10-2012-0035822 A | 4/2012 |
| KR | 10-2013-0113656 A | 10/2013 |
| KR | 10-2016-0048436 A | 5/2016 |
| KR | 10-2016-0050932 A | 5/2016 |
| KR | 10-2018-0120480 A | 11/2018 |
| WO | 2019/050146 A1 | 3/2019 |
| WO | 2018/159656 A1 | 1/2020 |

\* cited by examiner

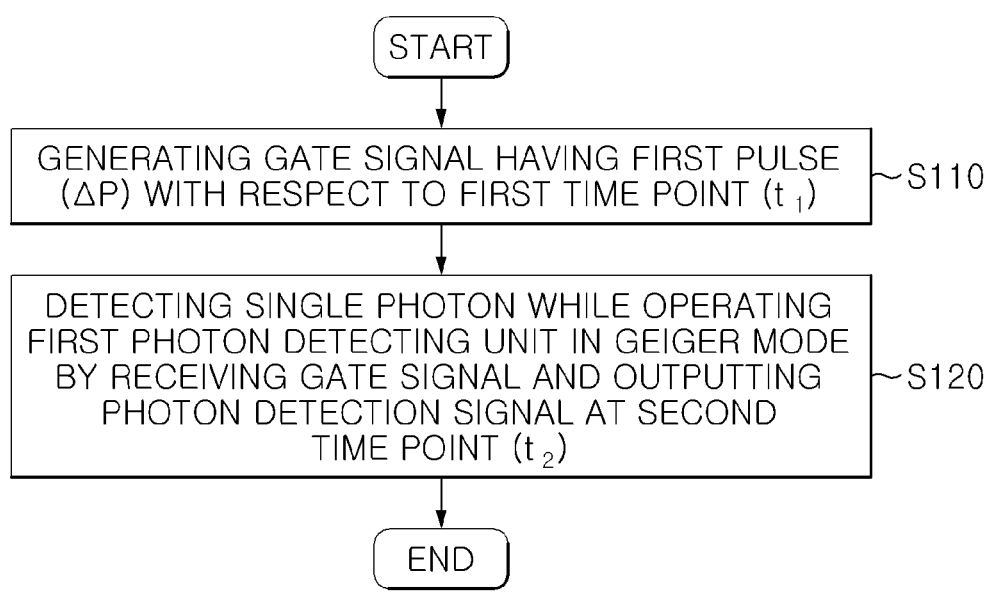

SINGLE PHOTON DETECTOR, AND OPERATION METHOD

CROSS REFERENCE TO RELATED APPLICATIONS

This application is a National Stage Patent Application of PCT International Patent Application No. PCT/KR2021/013926 (filed on Oct. 8, 2021) under 35 U.S.C. § 371, which claims priority to Korean Patent Application No. 10-2020-0132506 (filed on Oct. 14, 2020), the teachings of which are incorporated herein in their entireties by reference.

TECHNICAL FIELD

The present disclosure relates to a single photon detector and an operating method thereof. More specifically, the present disclosure relates to a single photon detector detecting a single photon signal by separating the signal photon signal from dark count noise and not requiring a cooling system, which enable the single photon detector to function at room temperature and to have a reduced size.

BACKGROUND ART

Recently, as wired and wireless communication services have been widely spread and social awareness of personal information has increased, security issues related to communication networks have become an important issue. In particular, security in communication networks related to countries, businesses, finance, and other fields extends beyond personal issues to become a social issue, emphasizing the importance of security even more.

However, with the development of hacking techniques, the secure communication according to the prior based on existing technology has become more vulnerable to external attacks that can expose communication contents. As a next-generation security technology, quantum cryptography communication guarantees very high security and is gaining attention.

Here, in quantum cryptography communication, a single photon (or quasi-single photon) is used to ensure security by utilizing quantum properties. A single photon detector is used to detect the single photon.

Since the single photon has a very small amount of light, it is impossible to detect the single photon with a typical photodetector. Accordingly, an avalanche photo-diode (APD) is commonly used to construct a single photon detector.

As shown in FIG. 1, a periodic gate signal is applied to operate the single photon detector, and the single photon detector generates a response signal to the gate signal. However, the response signal is also called background noise. Such a background noise may occur at a time when an output signal by a single photon fluctuates between a minimum value and a maximum value, and it causes difficulty in detecting the single photon.

Therefore, as a common method, the single photon is detected by increasing the gain of the single photon detector and separating only a single photon detection signal generated above background noise. However, in this case, thermal noise increases inside the single photon detector due to the increase in the gain. Further, noise called dark count may occur even though no single photon is incident, and it is difficult to distinguish such a dark count noise from the single photon detection signal, In particular, since a large number of times dark count noises may occur when the single photon detector operates at room temperature, in order to suppress this, the single photon detector is cooled to −40 to −50° C. typically using a cooling system.

However, because of the cooling system, the operation of the single photon detector can be easily affected by changes in the external environment, and it is very difficult to miniaturize the single photon detector. On the other hand, when the single photon detector operates at room temperature, the dark count noise significantly increases, making it more difficult to detect the single photon.

Therefore, in a quantum cryptography communication system, there is a demand a single photon detector not requiring a cooling system for functioning at room temperature and having a reduced size.

DISCLOSURE OF INVENTION

Technical Problem

Therefore, the present disclosure has been made in view of the above-mentioned problems, and the present disclosure provides a single photon detector and an operation method thereof, the single photon detector functioning at room temperature without a cooling system and having a reduced size, thereby suppressing the occurrence of errors caused by dark count noise while operating the single photon detector in a quantum cryptography communication system.

Other detailed objects of the disclosure will be clearly identified and understood by experts or researchers in the art through the specific contents described below.

Solution to Problem

A single photon detector for detecting a single photon according to an embodiment of the disclosure may include a gate signal generator configured to generate a gate signal having a first pulse width $\Delta P$ with respect to a first time point $t_1$; and a first photon detector configured to detect the single photon while operating in a Geiger mode by receiving the gate signal and output a photon detection signal at a second time point $t_2$, wherein the first photon detector outputs the photon detection signal at the second time point $t_2$ spaced apart at a predetermine time interval $\Delta T$ from the first time point $t_1$.

In this case, the single photon detector may further include a photon detection signal subtractor configured to subtract a noise signal including dark count noise from the photon detection signal by the first photon detector and output a noise subtraction signal.

In addition, the single photon detector may further include a second photon detector configured to output a noise signal including the dark count noise, wherein the photon detection signal subtractor may output the noise subtraction signal by receiving the photon detection signal from the first photon detector and receiving the noise signal from the second photon detector.

Further, in the second photon detector, a bias voltage higher than a predetermined reference value may be applied to the second photon detector so that dark count noise continuously occurs without a single photon being incident.

Alternatively, the first time point $t_1$ may be a time point corresponding to a peak value of the dark count noise, and the second time point $t_2$ may be a time point corresponding to a peak value of the photon detection signal generated subsequent to the first time point $t_1$.

In addition, in the single photon detector, the first pulse width ΔP may be adjusted to include both the first time point $t_1$ and the second time point $t_2$.

In addition, since the single photon detector does not include a cooling system for lowering the temperature of the first photon detecting unit, the first photon detecting unit may operate at room temperature.

A method of operating a single photon detector according to an embodiment of the disclosure may include generating a gate signal having a first pulse width ΔP with respect to a first time point $t_1$; and detecting the single photon while operating in a Geiger mode by receiving the gate signal and outputting a photon detection signal at a second time point $t_2$, wherein, in the detecting of the first photon, the photon detection signal may be output at the second time point $t_2$ spaced apart at a predetermine time interval ΔT from the first time point $t_1$.

Advantageous Effects of Invention

According to the disclosure, the single photon detector may separate a photon detection signal from dark count noise and detect the separated photon detection signal. Therefore, the signal photon detector according to the embodiment operates at room temperature and has a reduced size because it does not require a cooling system.

BRIEF DESCRIPTION OF DRAWINGS

The accompanying drawings, which are included as part of the detailed description to aid understanding of the disclosure, provide examples of the disclosure, and explain the technical idea of the disclosure together with the detailed description.

FIG. 6 is a flowchart illustrating a method of operating a single photon detector according to an embodiment of the disclosure.

BEST MODE FOR CARRYING OUT THE INVENTION

The present disclosure may apply various modifications and may have various embodiments. Hereinafter, specific embodiments will be described in detail based on the accompanying drawings.

The following embodiments are provided to facilitate a comprehensive understanding of the method, apparatus and/or system described in this specification. However, this is only an example and the present disclosure is not limited thereto.

In describing the exemplary embodiments of the present disclosure, a detailed description of the known art related to the present disclosure will be omitted when it is judged that the detailed description may unnecessarily make the gist of the present invention unclear. In addition, terms to be described below as terms which are defined in consideration of functions in the present invention may vary depending on the intention of a user or an operator or usual practice. Accordingly, the terms need to be defined based on contents throughout this specification. Terms used in a detailed description are to just describe the exemplary embodiments of the present disclosure and should not be restrictive in any way. Unless specifically used otherwise, expression of a singular form includes a meaning of a plural form. In the present description, an expression such as "including" or "comprising" is intended to indicate certain features, numbers, steps, operations, elements, some or combinations thereof and should not be construed to preclude the presence or possibility of one or more other features, numbers, steps, operations, elements, some or combinations thereof in addition to the described things.

In addition, terms including as first, second, and the like are used for describing various constituent elements, but the constituent elements are not limited by the terms and the terms are used only for distinguishing one constituent element from other constituent elements.

Hereinafter, exemplary embodiments of a single photon detector and an operation method thereof according to an embodiment of the present disclosure will be sequentially described with reference to the accompanying drawings.

Figure 1:
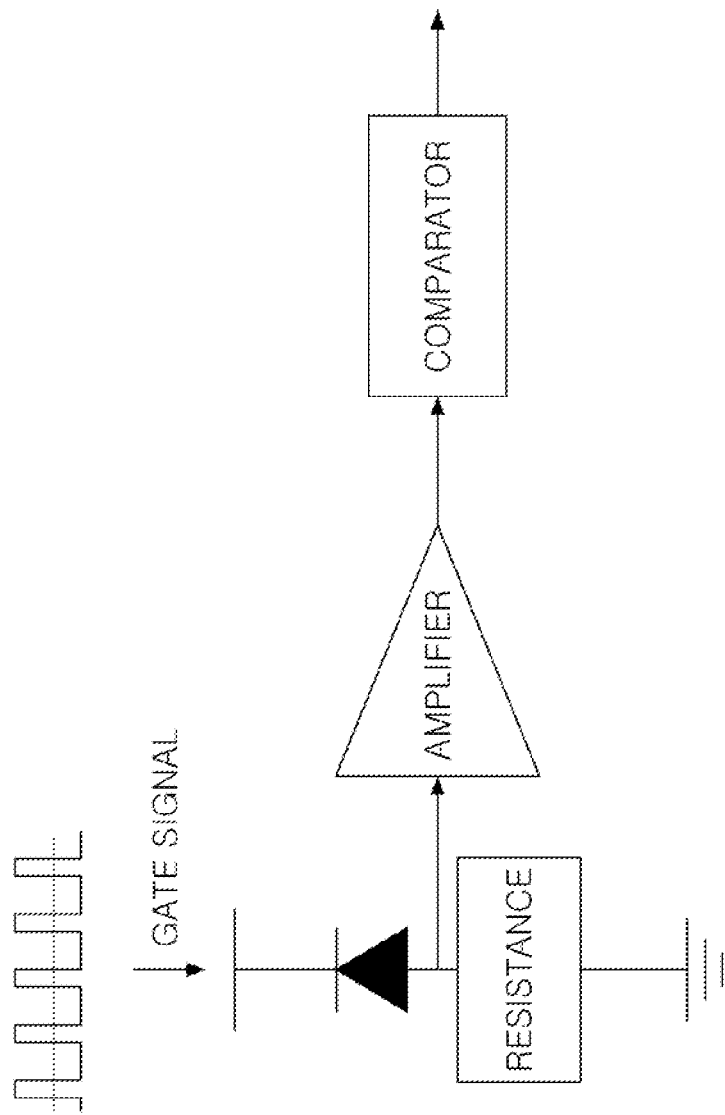
FIG. 1 is a diagram illustrating a single photon detector according to the related art.
Figure 2:
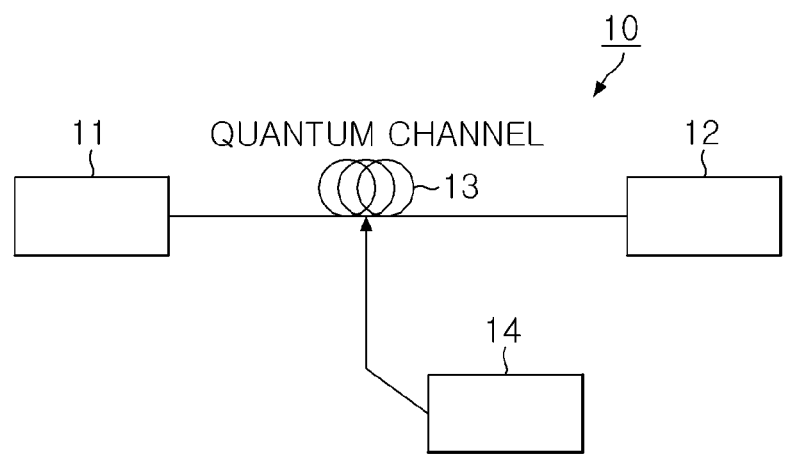
FIG. 2 is a diagram illustrating a quantum cryptography communication system according to an embodiment of the disclosure.

FIG. 2 illustrates a quantum cryptography communication system 10 according to an embodiment of the disclosure is illustrated. Referring to FIG. 2, the quantum cryptography communication system 10 according to an embodiment of the disclosure may include a transmitter 11, a receiver 12, and a quantum channel 13. The transmitter 11 and the receiver 12 generate and share a quantum cryptographic key while exchanging optical signals through the quantum channel 13. Further, transmitter 11 and receiver 12 perform quantum communication using the quantum cryptographic key.

For example, the transmitter 11 and the receiver 12 may be 1) servers 2) clients or terminal devices connected to the server, 3) communication devices such as a gateway and a router, or 4) portable devices having mobility. In addition, the transmitter 11 and the receiver 12 may be configured with various devices capable of generating and sharing a quantum cryptographic key to perform communication.

In addition, the quantum channel 13 is provided between the transmitter 11 and the receiver 12 to transmit an optical signal. The quantum channel 13 may be configured with an optical fiber according to an embodiment. However, the present disclosure is not limited thereto. For example, the quantum channel 13 may be any medium capable of transmitting an optical signal.

Accordingly, the transmitter 11 and the receiver 12 may exchange information necessary for generating a quantum cryptographic key using the phase, polarization, etc., of the optical signal using various protocols such as a BB84 protocol, and may generate and share the quantum cryptographic key. Therefore, it is possible to effectively prevent an attacker 14 from attempting to steal the quantum encryption key and hacking.

According to an embodiment, the transmitter 11 and the receiver 12 may include a quantum key distribution device and a quantum key management device. the quantum cryptographic key distribution device (QKD) generates a quantum key stream and provides it to the quantum cryptographic key management device (QKM). The quantum cryptographic key management device (QKM) may generate a quantum cryptographic key according to the related standard specifications of a service device that performs quantum cryptographic communication and provide the generated quantum cryptographic key to the service device. Accordingly, the service device may enhance the security of the communication system by performing quantum cryptographic communication by encrypting and transmitting or decrypting plain text using the provided quantum cryptographic key.

Figure 3:
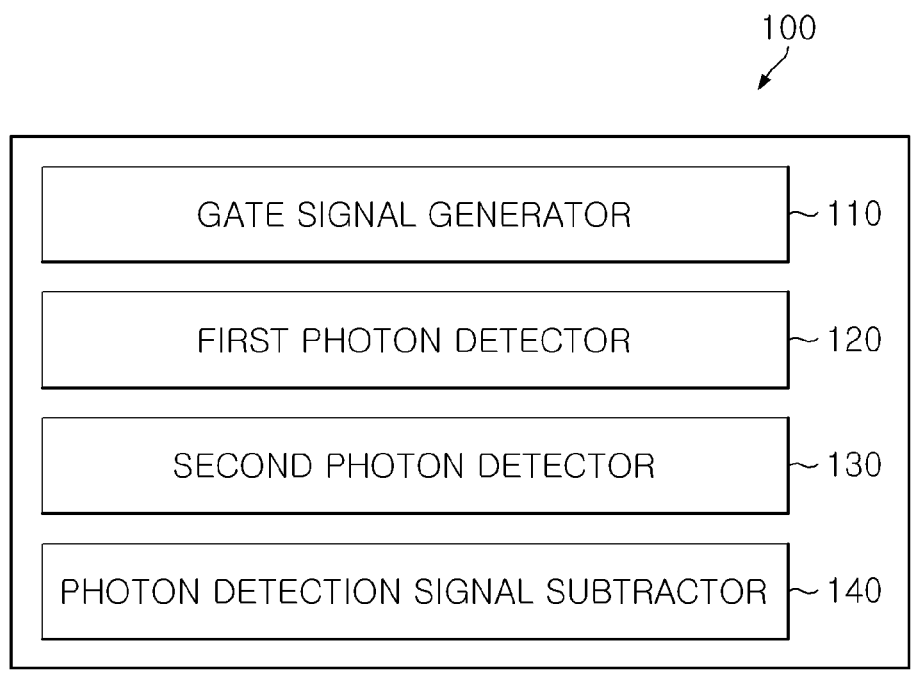
FIG. 3 is a block diagram illustrating a single photon detector according to an embodiment of the disclosure.

FIG. 3 is a block diagram illustrating a single photon detector 100 according to an embodiment of the disclosure. Here, the single photon detector 100 may detect a single photon (or a quasi-single photon corresponding thereto) from the receiver 12 or the like.

The single photon has a very small amount of light so it is impossible to detect the single photon using a typical photo detector. According to an embodiment of the disclosure, the single photon detector 100 includes an avalanche photo-diode (APD) that operates in a Geiger mode to detect a single photon.

More specifically, as shown in FIG. 3, the single photon detector 100 according to an embodiment of the disclosure may include a gate signal generator 110 configured to generate a gate signal having a first pulse width ΔP with respect to a first time point $t_1$; and a first photon detector 120 configured to detect the single photon while operating in a Geiger mode by receiving the gate signal and output a photon detection signal at a second time point $t_2$. The first photon detector 120 outputs the photon detection signal at the second time point $t_2$ spaced apart at a predetermine time interval ΔT from the first time point $t_1$.

More specifically, the gate signal generator 110 may generate the gate signal having the first pulse width ΔP with respect to the first time point $t_1$ and provide the generated gate signal to the first photon detector 120.

Accordingly, the first photon detector 120 may receive the gate signal, detect a single photon from the received gate signal, and output a photon detection signal.

Here, the first photon detector 120 may be configured with an avalanche photo-diode (APD) according to an embodiment. However, the disclosure is not limited thereto.

Accordingly, as a periodic gate signal is applied to the APD, the APD may generate an output signal while operating in the Geiger mode.

Here, when the first photon detector 120 receives a single photon (or a quasi-single photon corresponding thereto), the first photon detector 120 may output a photon detection signal by the single photon.

The first photon detector 120 may output the photon detection signal at the second time point $t_2$ spaced apart at the predetermined time interval ΔT from the first time point $t_1$, so that the photon detection signal by the single photon may be output spaced apart from the noise signal caused by the dark count noise. Accordingly, even if noise such as the dark count noise occurs, a single photon may be detected by identifying the photon detection signal.

Furthermore, as shown in FIG. 3, the single photon detector 100 according to an embodiment of the disclosure may further include a second photon detector 130 configured to output a noise signal including dark count noise, and a photon detection signal subtractor 140 configured to output a noise subtraction signal by subtracting a noise signal including dark count noise from the photon detection signal by the first photon detector 120.

Figure 4:
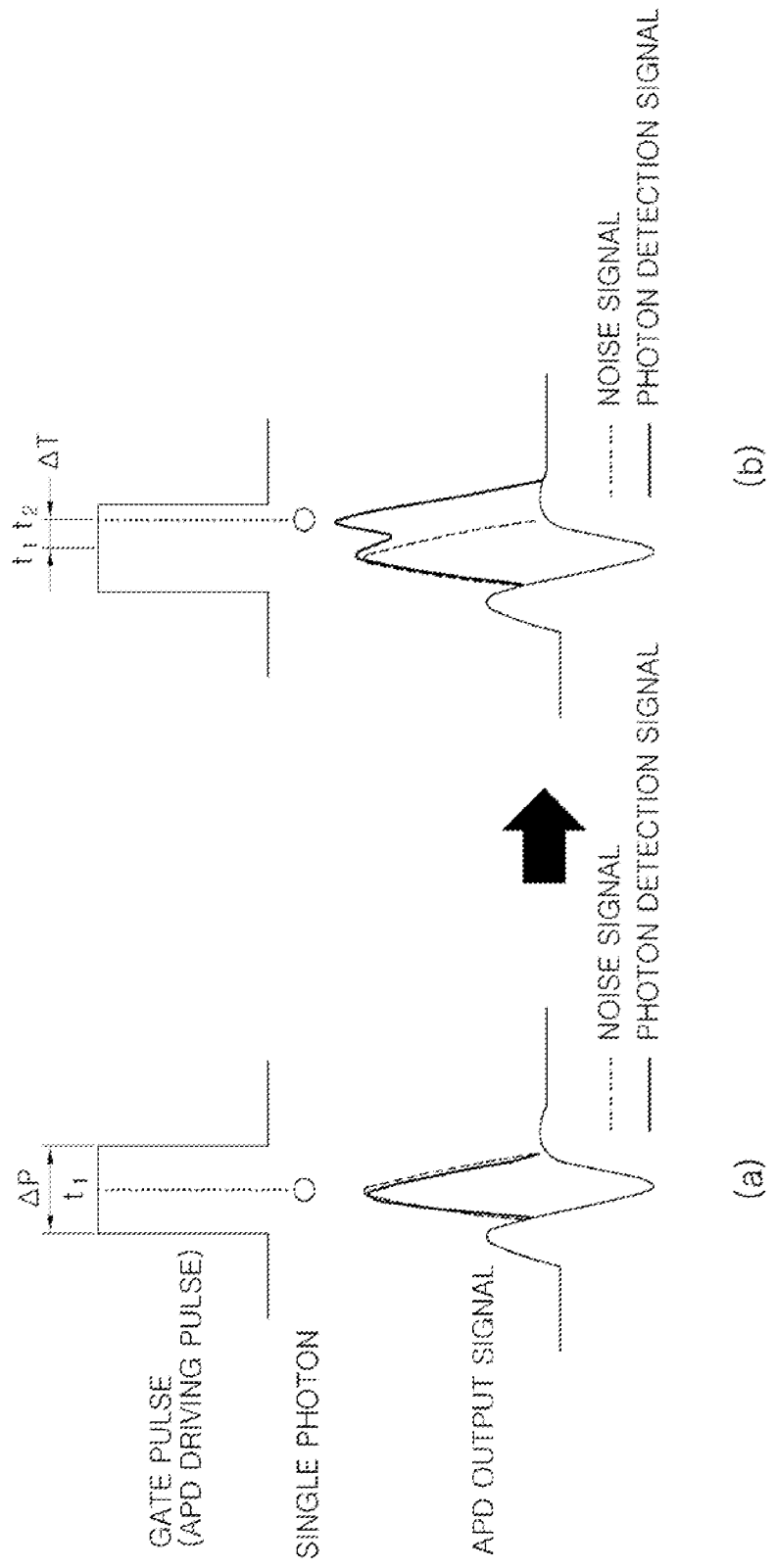
FIGS. 4 and 5 are diagrams illustrating the operation of a single photon detector according to an embodiment of the disclosure.

As shown in FIG. 4, the single photon detector 100 according to an embodiment of the disclosure separates and detects the noise signal including the dark count noise from the photon detection signal output from the first single photon detector 120. Accordingly, the single photon detector 100 may detect a single photon without a cooling system thereby, operating at room temperature and having a reduced size.

The diagram (a) of FIG. 4 shows a related art to apply a gate pulse for operating the APD. As shown in (a) of FIG. 4, it is controlled to locate a timing of the incident of a single photon at a point of generating the single photon detection signal as much as possible when the gate pulse is applied to the APD. Furthermore, in order to maximize the stability of single photon detection even if the timing at which the single photon is incident slightly fluctuates according to the temperature change of the quantum channel 13, etc., the single photon was adjusted to be incident at the first time point $t_1$ corresponding to the center point of the gate signal having the first pulse width ΔP.

Therefore, in the related art, it was necessary to suppress the occurrence of dark count noise as much as possible in the APD. Accordingly, a cooling system was essentially equipped with the APD so that the internal temperature of the APD was cooled to −40 to −50° C. to suppress the dark count noise.

In the diagram (b) of FIG. 4 shows operations of the single photon detector 100 according to an embodiment of the disclosure. The first photon detector 120 may detect a single photon while operating in the Geiger mode by receiving the gate signal and output a photon detection signal at the second time point $t_2$. The first photon detector 120 may output the photon detection signal at the second time point $t_2$ spaced apart at a predetermined time interval ΔT from the first time point $t_1$, so that the photon detection signal by the single photon may be output spaced apart from the noise signal caused by the dark count noise. Accordingly, even if noise such as the dark count noise occurs, a single photon may be detected by identifying the photon detection signal.

As shown in FIG. 4, the single photon detector 100 according to an embodiment of the disclosure may adjust the second time point $t_2$ to a time delayed by a predetermined time interval ΔT from the first time point $t_1$.

In addition, the single photon detector 100 according to an embodiment of the disclosure may space apart the second time point $t_2$ of outputting the photon detection signal in consideration of the time point of generating dark count noise in the first photon detector 120.

More specifically, the first time point $t_1$ may be a time point corresponding to a peak value of the dark count noise, and the second time point $t_2$ may be a time point corresponding to a peak value of the photon detection signal generated subsequent to the first time point $t_1$.

Furthermore, the single photon detector 100 according to an embodiment of the disclosure may adjust the first pulse width ΔP to include both the first time point $t_1$ and the second time point $t_2$.

More specifically, as shown in FIG. 4, when the separation between the first time point $t_1$ corresponding to the peak value of the dark count noise and the second time point $t_2$ corresponding to the peak value of the photon detection signal is insufficient, the single photon detector 100 according to an embodiment may be difficult for efficiently detect the single photon. Accordingly, according to an embodiment, the second time point $t_2$ may be adjusted to be properly spaced from the first time point $t_1$. Accordingly, the detection efficiency for the single photon may be improved by adjusting the first pulse width ΔP to include both the first time point $t_1$ and the second time point $t_2$.

Therefore, the single photon detector 100 according to an embodiment of the disclosure may delay the second time point $t_2$ of outputting the photon detection signal from the first single photon detector 120 form the first time point $t_1$ and adjust the first pulse width $\Delta P$ of the gate signal. Therefore, single photon detection efficiency may be improved in the single photon detector 100.

Figure 5:
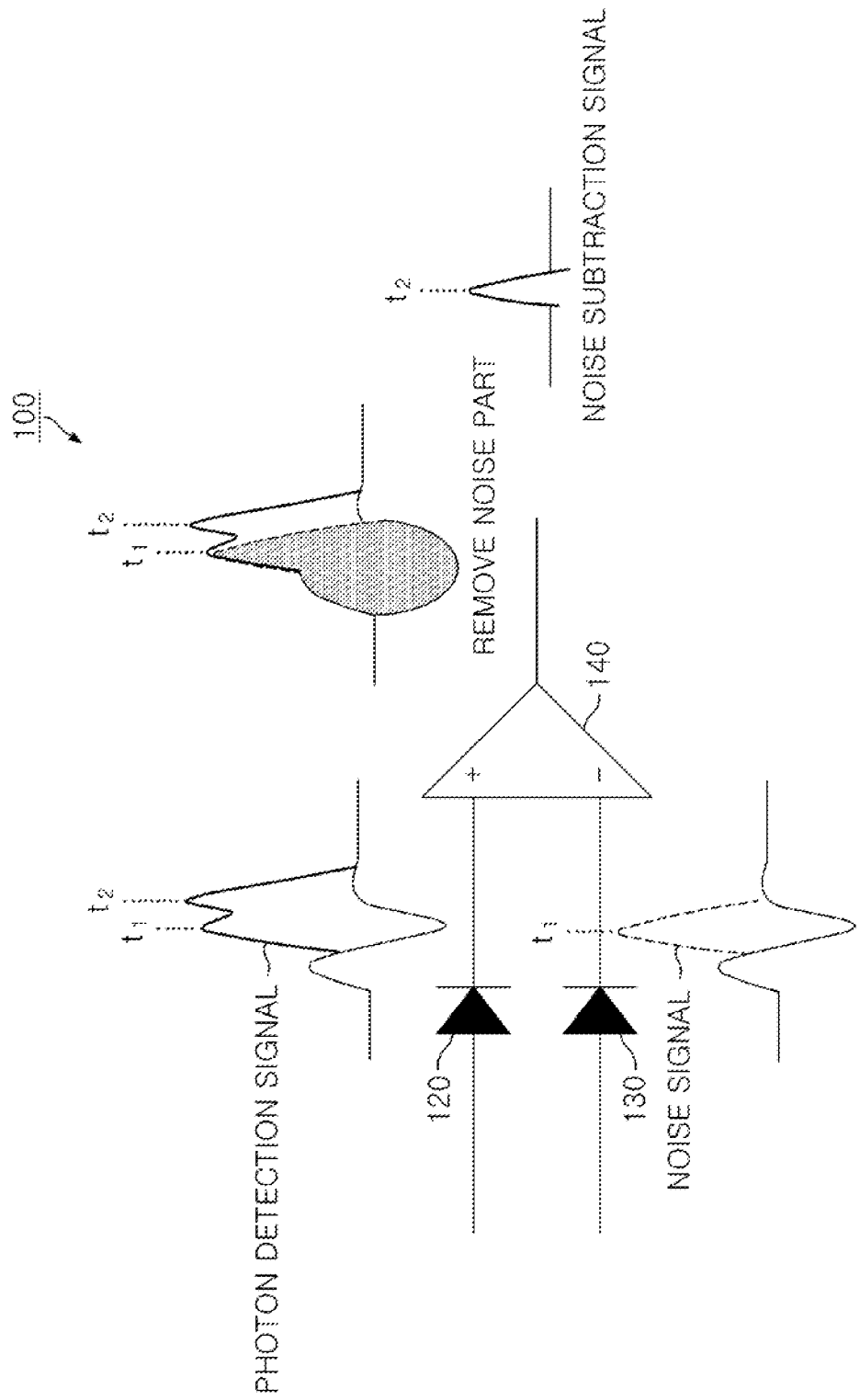

As shown in FIG. 5, the single photon detector 100 according to an embodiment of the disclosure may include i) a second photon detector 130 configured to output a noise signal including dark count noise and ii) a photon detection signal subtractor 140 configured to output a noise subtraction signal by subtracting a noise signal including dark count noise from the photon detection signal by the first photon detector 120.

Accordingly, the photon detection signal subtractor 140 may output the noise subtraction signal by receiving the photon detection signal from the first photon detector 120 and receiving the noise signal from the second photon detector 130.

At this time, the second photon detector 130 may have a structure to be supplied with a bias voltage higher than a predetermined reference value in order to generate dark count noise continuously while blocking the incidence of a single photon.

Accordingly, as shown in FIG. 5, the photon detection signal subtractor 140 may receive the photon detection signal from the first photon detector 120, receive the noise signal from the second photon detector 130, and output the noise subtraction signal obtained by subtracting the noise signal from the photon detection signal.

As shown in FIG. 5, it is possible to remove not only the dark count noise but also background signal noise from the noise subtraction signal output from the photon detection signal subtractor 140. Furthermore, it is also possible to detect even a weak photon detection signal which was impossible to be detect. Therefore, the detection efficiency may be improved according to an embodiment.

Furthermore, the single photon detector 100 according to an embodiment of the disclosure, the first photon detector 120 may operate at room temperature without a cooling system for lowering the temperature of the first photon detector 120 to effectively detect a single photon even when dark count noise is generated. Accordingly, the single photon detector may have a reduced size.

Mode for Implementing the Invention

In addition, FIG. 6 illustrates a flowchart illustrating a method of operating a single photon detector according to an embodiment of the disclosure. The method of operating the single photon detector according to an embodiment of the disclosure may include generating (S110) a gate signal having a first pulse width $\Delta P$ with respect to a first time point $t_1$; and detecting (S120) the single photon while operating in a Geiger mode by receiving the gate signal and outputting a photon detection signal at a second time point $t_2$, wherein, in the detecting (S120) of the first photon, the photon detection signal is output at the second time point $t_2$ spaced apart at a predetermine time interval $\Delta T$ from the first time point $t_1$.

In this case, since the description of the single photon detector 100 and FIGS. 2 to 5 may be referred to the method of operating the single photon detector according to an embodiment of the disclosure, repetition of a detailed description thereof will be herein omitted.

In addition, a computer program according to another embodiment of the disclosure is characterized in that it is a computer program stored in a computer-readable medium in order to execute each step of the method of operating the single photon detector described above on a computer. The computer program may be a computer program including machine language code generated by a compiler, as well as a computer program including high-level language code that can be executed on a computer using an interpreter or the like. At this time, the computer is not limited to a personal computer (PC) or a notebook computer, and is equipped with a central processing unit (CPU) such as a server, communication equipment, smart phone, tablet PC, PDA, mobile phone, etc. to execute a computer program. of the information processing device. In addition, the computer-readable medium is an electronic recording medium (e.g., ROM, flash memory, etc.), a magnetic storage medium (e.g., floppy disk, a hard disk, etc.), an optical reading medium (e.g., CD-ROM, DVD, etc.) and carrier waves (e.g., transmission through the Internet), including all storage media that can be read by a computer.

Accordingly, in the single photon detector and the operation method thereof according to an embodiment of the disclosure, the photon detection signal may be separated and detected from the dark count noise, so that the single photon detector may be implemented without a cooling system, thereby enabling the single photon detector to operate at room temperature and have a reduced size.

The above description is merely an example of the technical idea of the present inventive concept, and various modifications and variations can be made to those skilled in the art without departing from the concept of the present inventive concept. Accordingly, the above-described embodiments are not intended to limit the technical idea of the present inventive concept, and the scope of the technical idea of the present inventive concept is not limited by the embodiments. The scope of protection of the present inventive concept should be interpreted according to claims, and all technical ideas equivalent thereto should be interpreted as being included in the scope of the disclosure.

The invention claimed is:

1. A single photon detector for detecting a single photon, comprising:
    a gate signal generator configured to generate a gate signal having a first pulse width $\Delta P$ with respect to a first time point $t_1$;
    a first photon detector configured to receive the gate signal, operate in a Geiger mode, detect the single photon, and output a photon detection signal at a second time point $t_2$; and
    a photon detection signal subtractor configured to subtract a noise signal including dark count noise from the photon detection signal by the first photon detector and output a noise subtraction signal,
    wherein the first photon detector outputs the photon detection signal at the second time point $t_2$ spaced apart at a predetermine time interval $\Delta T$ from the first time point $t_1$.

2. The single photon detector of claim 1, further comprising:
    a second photon detector configured to output a noise signal including the dark count noise,
    wherein the photon detection signal subtractor receives the photon detection signal from the first photon detector, receives the noise signal from the second photon detector, and outputs the noise subtraction signal.

3. The single photon detector of claim 2, wherein the second photon detector receives a bias voltage higher than a predetermined reference value to generate dark count noise without single photon incident.

4. The single photon detector of claim 2, wherein:
    the first time point $t_1$ is a time point corresponding to a peak value of the dark count noise; and the second time point $t_2$ is a time point corresponding to a peak value of the photon detection signal generated subsequent to the first time point $t_1$.

5. The single photon detector of claim 1, wherein, the single photon detector adjusts the first pulse width ΔP to include both the first time point $t_1$ and the second time point $t_2$.

6. The single photon detector of claim 1, wherein the first photon detector operates at room temperature without a cooling system for lowering the temperature of the first photon detector.

7. A method of operating a single photon detector, comprising:
- generating a gate signal having a first pulse width ΔP with respect to a first time point $t_1$; and
- receiving the gate signal, operating in a Geiger mode, detecting a single photon, and outputting a photon detection signal at a second time point $t_2$; and
- subtracting a noise signal including dark count noise from the photon detection signal by the first photon detector and output a noise subtraction signal,
- wherein, in the outputting the photon detection signal, the photon detection signal is output at the second time point $t_2$ spaced apart at a predetermine time interval ΔT from the first time point $t_1$.

\* \* \* \* \*